UNITED STATES PATENT OFFICE 2,414,989

METHOD FOR THE PREPARATION OF 2,5-DICHLORODIOXANE

Robert R. Umhoefer, Pittsfield, Mass.

No Drawing. Continuation of application Serial No. 351,154, August 3, 1940. This application August 5, 1944, Serial No. 548,309

3 Claims. (Cl. 260—338)

This invention relates to the compound 2,5-dichlorodioxane and a method for the preparation thereof.

The compound 2,5-dichlorodioxane has the following general formula:

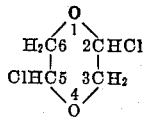

While many derivatives of dioxane have heretofore been prepared it has never been possible heretofore to prepare the 2,5-dichloro derivative.

One of the objects of the present invention is to prepare for the first time the compound known as 2,5-dichlorodioxane.

Another object of the invention is to provide a new and improved method for producing 2,5-dichlorodioxane. Other objects will appear hereinafter.

These objects are accomplished in accordance with this invention by the preparation of 2,5-dichlorodioxane having the formula given above. This compound was prepared in accordance with the invention by passing dry hydrogen chloride into a solution of dioxadiene and dry carbon tetrachloride. After the carbon tetrachloride was removed in a vacuum desiccator, the residue was warmed with petroleum ether and the solution decanted from some insoluble material. The petroleum ether solution on cooling deposited needle-like crystals of 2,5-dichlorodioxane, melting at 117°–118° C. The new compound was readily hydrolyzed by water, and the solution yielded the p-nitrophenylosazone of glycol aldehyde when treated with p-nitrophenylhydrazine, showing that glycol aldehyde was formed by the hydrolysis.

The invention will be illustrated but is not limited by the following example, in which the quantities are stated in parts by weight unless otherwise indicated.

Example

Approximately 0.35 mol of dry hydrogen chloride was passed into a solution of 4.9 g. of dioxadiene and 5 cc. of dry carbon tetrachloride. Some solid separated during the reaction. After the carbon tetrachloride was removed in a vacuum desiccator, the residue was warmed with petroleum ether and the solution decanted from some insoluble material. The petroleum ether solution on cooling deposited needle-like crystals of 2,5-dichlorodioxane, M. P. 117°–118°. It was readily hydrolyzed by water and the solution yielded the p-nitrophenylosazone of glycol aldehyde when treated with p-nitrophenylhydrazine; M. P. 300° (uncorr.).

The 2,5-dichlorodioxane prepared as above described differs very markedly in its properties from the closest known homologue, namely, the 2,3-dichlorodioxane, a few of which differences will be apparent by reference to the following table:

| 2,5-dichlorodioxane | 2,3-dichlorodioxane |
| --- | --- |
| 1. Solid, melting point 117°–118° C. | 1. Liquid. |
| 2. Upon hydrolysis yields glycol aldehyde. | 2. Upon hydrolysis yields glyoxal and ethylene glycol. |
| 3. Nearly insoluble in ethyl ether. | 3. Very soluble in ethyl ether. |
| 4. Forms 2,5-disubstituted dioxanes. | 4. Forms 2,3 disubstituted dioxanes. |

It is important to note that one of the distinctive properties of 2,5-dichlorodioxane is that glycol aldehyde may be prepared from 2,5-dichlorodioxane by hydrolysis. It cannot be obtained from 2,3-dichlorodioxane by hydrolysis. Glycol aldehyde is the simplest hydroxy aldehyde $$(HO.CH_2.CHO).$$

Glycol aldehyde is the simplest sugar. Glycol aldehyde, or formoin, is also the simplest acyloin. Glycol aldehyde is useful in the synthesis of solvents, plastics, etc. At the present time glycol aldehyde is a rare compound, thus the present invention makes possible the preparation of a heretofore rare compound by a simple and practical method.

The 2,5-dichlorodioxane has other new and unique chemical and physical properties as compared to the 2,3-dichlorodioxane. One very important property of the 2,5-dichlorodioxane, which does not exist in the 2,3-dichlorodioxane, is that it is a bi-functional compound (considering the chlorine atoms as functional components) wherein the functional elements are in positions opposite each other and, therefore, can be condensed or polymerized to produce linear condensation products, whereas the 2,3-dichloro derivative cannot.

Although many attempts have been made heretofore to prepare the 2,5-dichlorodioxane, these attempts have been unsuccessful prior to this invention. The present invention, therefore, supplies for the first time a compound having unique and heretofore undescribed properties.

The presence of a solvent during the reaction of the hydrogen chloride upon the dioxadiene facilitates the reaction. The solvent should preferably be a substantially non-aqueous organic solvent for the dioxadiene which is substantially inert to hydrogen chloride under the conditions of reaction, e. g., at room temperatures and atmospheric pressure. The solvent should also preferably be a solvent for hydrogen chloride. It can be a solvent for the desired product, or the desired product may be insoluble in the solvent. Other solvents can be used in separating the desired product from the reaction mixture. Inert solvents such as carbon tetrachloride or chlorinated hydrocarbons are preferably employed. It will be understood that other variations may be made in the process described without departing from the invention.

This application is a continuation and substitution for my co-pending application Serial No. 351,154 originally filed August 3, 1940, in the name of William M. Smedley and myself, and later converted to a sole application in my name.

Having thus described the invention, what I claim as new and desire to secure by Letters Patent of the United States is:

1. A method of preparing 2,5-dichlorodioxane which comprises passing substantially dry hydrogen chloride into dioxadiene.

2. A method of preparing 2,5-dichlorodioxane which comprises passing dry hydrogen chloride into a solution of dioxadiene in dry carbon tetrachloride.

3. A method of preparing 2,5-dichlorodioxane which comprises passing dry hydrogen chloride into a solution of dioxadiene in a substantially non-aqueous organic solvent which is substantially inert to hydrogen chloride.

ROBERT R. UMHOEFER.